(12) United States Patent
Welch

(10) Patent No.: US 7,234,268 B2
(45) Date of Patent: Jun. 26, 2007

(54) BUG KILLING DEVICE

(76) Inventor: Tommy D. Welch, 2050 Duncannon, NW., Canton, OH (US) 44708

( * ) Notice: Subject to any disclaimer, the term of this patent is extended or adjusted under 35 U.S.C. 154(b) by 69 days.

(21) Appl. No.: 11/013,776

(22) Filed: Dec. 16, 2004

(65) Prior Publication Data

US 2005/0126068 A1 Jun. 16, 2005

Related U.S. Application Data

(60) Provisional application No. 60/529,816, filed on Dec. 16, 2003.

(51) Int. Cl.
*A01M 1/20* (2006.01)

(52) U.S. Cl. .......................................... 43/112; 43/113

(58) Field of Classification Search ................. 43/112, 43/113, 107, 139
See application file for complete search history.

(56) References Cited

U.S. PATENT DOCUMENTS

| | | | | |
|---|---|---|---|---|
| 2,113,409 A | * | 4/1938 | Niemeyer ..................... | 43/113 |
| 3,796,001 A | * | 3/1974 | Jackson ........................ | 43/113 |
| 4,283,878 A | | 8/1981 | Hill | |
| 4,523,404 A | * | 6/1985 | DeYoreo ...................... | 43/112 |
| 4,694,604 A | * | 9/1987 | Mitchell ....................... | 43/114 |
| 4,785,573 A | * | 11/1988 | Millard ......................... | 43/112 |
| 4,852,296 A | * | 8/1989 | Swanson et al. .............. | 43/112 |
| 4,907,366 A | | 3/1990 | Balfour | |
| 5,205,064 A | * | 4/1993 | Nolen ........................... | 43/112 |
| 5,241,779 A | * | 9/1993 | Lee ............................... | 43/139 |
| 5,255,468 A | * | 10/1993 | Cheshire, Jr. ................. | 43/113 |
| 5,657,576 A | * | 8/1997 | Nicosia ..................... | 43/132.1 |
| 5,799,436 A | | 9/1998 | Nolen | |
| 6,050,025 A | * | 4/2000 | Wilbanks ...................... | 43/112 |
| 6,055,766 A | * | 5/2000 | Nolen et al. .................. | 43/112 |
| 6,088,949 A | * | 7/2000 | Nicosia et al. ................ | 43/107 |
| 6,134,826 A | * | 10/2000 | Mah ............................. | 43/112 |
| 6,145,243 A | * | 11/2000 | Wigton et al. ................ | 43/139 |
| 6,195,932 B1 | * | 3/2001 | Aicher ......................... | 43/112 |
| 6,305,122 B1 | * | 10/2001 | Iwao et al. .................... | 43/112 |
| 6,425,202 B1 | * | 7/2002 | Lin et al. ...................... | 43/107 |
| 6,530,172 B2 | * | 3/2003 | Lenz ............................ | 43/112 |
| 6,594,944 B2 | * | 7/2003 | Chura ........................... | 43/98 |
| 6,594,946 B2 | * | 7/2003 | Nolen et al. .................. | 43/114 |
| 6,618,984 B1 | * | 9/2003 | Li ................................. | 43/112 |
| 6,655,078 B2 | * | 12/2003 | Winner et al. ................ | 43/114 |
| 6,655,080 B2 | | 12/2003 | Spiro | |
| 6,662,489 B2 | | 12/2003 | Spiro | |
| 6,665,979 B1 | * | 12/2003 | Hsu ............................. | 43/112 |
| 6,675,528 B2 | | 1/2004 | Jablin | |
| 6,688,035 B1 | * | 2/2004 | Shichman .................... | 43/112 |
| 6,718,685 B2 | | 4/2004 | Bossler | |
| 6,718,687 B2 | | 4/2004 | Robison | |
| 6,779,296 B1 | | 8/2004 | Mosher, II | |
| 6,817,139 B1 | * | 11/2004 | Powell et al. ................. | 43/113 |
| 6,823,622 B2 | * | 11/2004 | Lin et al. ...................... | 43/122 |
| 6,854,208 B1 | * | 2/2005 | Chuang et al. ............... | 43/125 |
| 6,874,273 B1 | * | 4/2005 | Weisenburg, III ............. | 43/112 |
| 6,892,492 B2 | * | 5/2005 | Durand et al. ................ | 43/139 |
| 6,898,896 B1 | * | 5/2005 | McBride et al. .............. | 43/113 |
| 6,920,716 B2 | * | 7/2005 | Kollars et al. ................ | 43/114 |
| 6,925,752 B1 | * | 8/2005 | Cherry et al. ................. | 43/139 |
| 6,978,572 B1 | * | 12/2005 | Bernklau et al. ........... | 43/132.1 |
| 6,990,768 B1 | * | 1/2006 | Boston ...................... | 43/132.1 |

* cited by examiner

*Primary Examiner*—Kimberly S. Smith
(74) *Attorney, Agent, or Firm*—Zollinger & Burleson Ltd

(57) ABSTRACT

A bug killing device includes a body that defines a combustion chamber with a candle disposed in the combustion chamber. The burning candle produces heated gases that include carbon dioxide. A first bait receptacle is disposed above the combustion chamber with bait being disposed in the first bait receptacle such that the heat from the burning candle warms the bait receptacle to evaporate bait into an electrified grid.

19 Claims, 5 Drawing Sheets

BUG KILLING DEVICE

CROSS REFERENCE TO RELATED APPLICATIONS

This application claims priority from U.S. Provisional Patent Application Ser. No. 60/529,816 filed Dec. 16, 2003; the disclosures of which are incorporated herein by reference.

BACKGROUND OF THE INVENTION

1. Technical Field

The present invention generally relates to insect killing devices and, more particularly, to the class of insect killing devices that uses a bait to lure the insects toward the device. Specifically, the present invention combines the use of lures to draw insects, particularly mosquitos, towards an electrified grid and/or sticky umbrella.

2. Background Information

Home and business owners desire to reduce or eliminate the number of biting insects, particularly mosquitos, from their backyards and business areas. Numerous traps, sprays, and killing devices are known in the art for reducing the number of biting insects from these areas. These devices include those that use various types of baits and lures to draw the bugs toward the devices. The devices use electricity, poison, and sticky surfaces to eliminate the bugs. The lures include devices that generate carbon dioxide, light, heat, and scents. One drawback with known devices is the expense of the fuels used to create or supply carbon dioxide to the device. One class of devices burns a gas such as natural gas or propane to create the carbon dioxide. Another class of devices uses pressurized containers of carbon dioxide. Both of these devices have pressurized containers which create a safety risk. These devices also require the users to purchase relatively expensive fuel or gas containers as they are depleted. Despite the numerous traps and killing devices known in the art, room remains for improvement.

BRIEF SUMMARY OF THE INVENTION

The invention provides a bug killing device that uses a source of carbon dioxide with an electrified grid or sticky surface to lure and trap insects.

One embodiment of the invention provides a bug killing device including a body; the body defining a combustion chamber; a candle in the combustion chamber; the candle producing heated gases when burned; the heated gases including carbon dioxide; a first bait receptacle disposed above the combustion chamber; a bait being disposed in the first bait receptacle; a first electrified grid disposed above the bait receptacle; and the heated gases from the burning candle warming the bait receptacle to evaporate bait into the electrified grid.

Another embodiment of the invention provides a bug killing device including: a body; the body defining a combustion chamber; a candle in the combustion chamber; the candle producing heated gases when burned; the heated gases including carbon dioxide; a first bait receptacle disposed above the combustion chamber; a bait being disposed in the first bait receptacle; a first electrified grid disposed above the bait receptacle; the heated gases from the burning candle warming the bait receptacle to evaporate bait into the electrified grid; a second electrified grid disposed below the combustion chamber; the body defining at least one opening providing fluid communication between the combustion chamber and the second electrified grid; a light disposed inside the second electrified grid; the body further defining a lower chamber; the lower chamber disposed below the second electrified grid; the lower chamber defining an inlet and an outlet; and delivery means for moving air from the inlet of the lower chamber towards the outlet of the lower chamber.

A further embodiment of the invention provides a venturi flow above the source of carbon dioxide. A cooling chamber is used between the source of carbon dioxide and the bait. The cooling chamber redirects the carbon dioxide to one or two electrified killing grids.

In another embodiment, the invention uses a sticky umbrella to trap insects that are drawn to the device.

In another embodiment, the invention provides a catalyst that converts the gas produced by a burning device to carbon dioxide to create a more effective bait.

In another embodiment, the invention provides a bug killing device that uses a fan to distribute the baited air.

In another embodiment, the invention provides a bait chamber that may be isolated with valves so that a secondary bait, such as octenol is not used during the times when the bug killing device is not in use.

In another embodiment, the invention provides a bug killing device having multiple light sources that are used to draw the insects towards the bug killing device.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
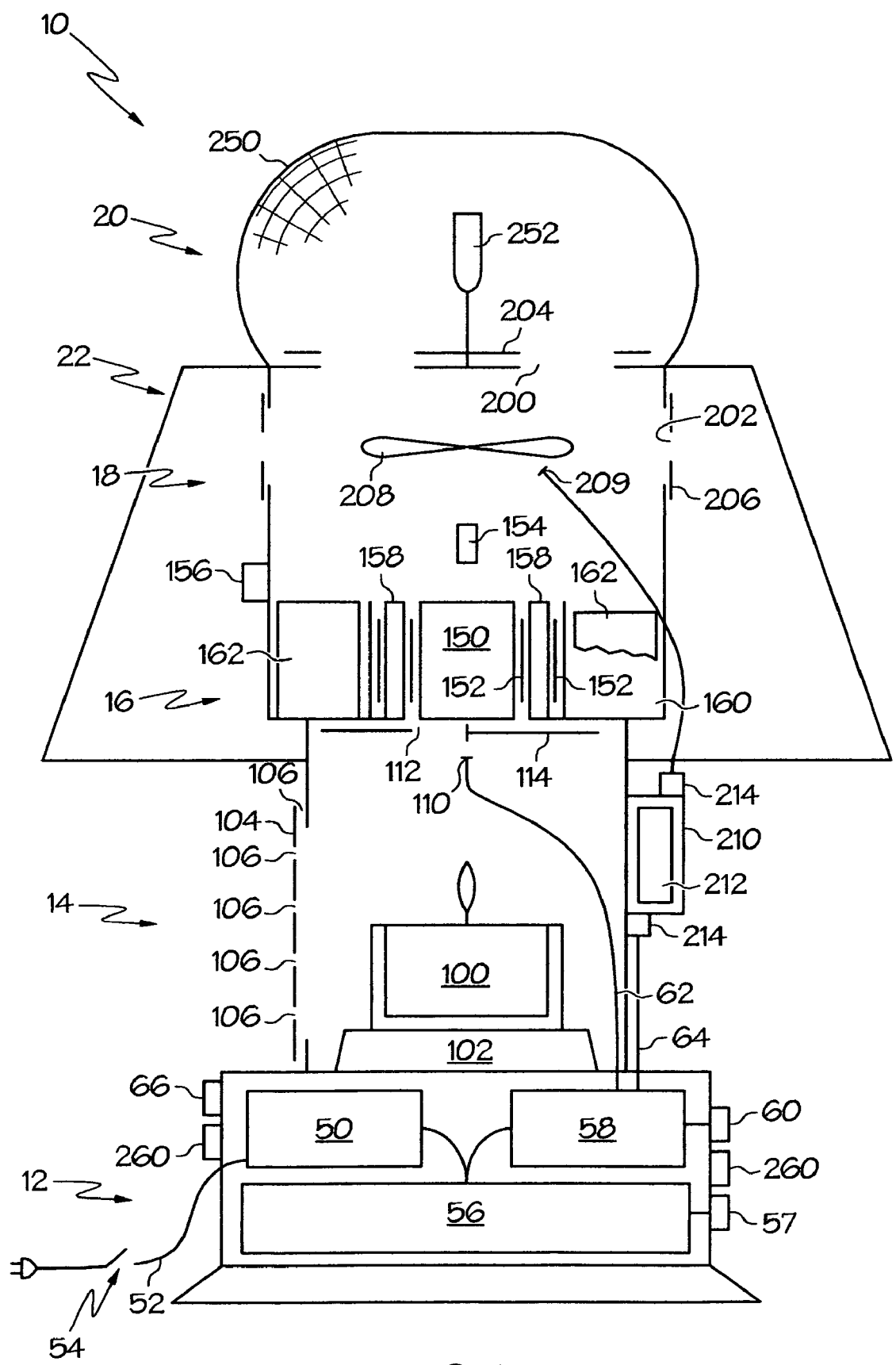
FIG. 1 is a longitudinal sectional view of one embodiment of the device with the components of the device shown schematically.

A first embodiment of the insect killing device of the present invention is indicated generally by the numeral 10 in the accompanying drawings. In one embodiment, device 10 generally includes a control box 12, a combustion chamber 14, a catalyst chamber 16, a mixing chamber 18, a grid assembly 20, and an umbrella 22. Device 10 functions to lure bugs to device 10 and to kill bugs once they arrive. When used outside, device 10 uses carbon dioxide as the primary bait for the bugs. In addition, device 10 may use a scented bait to help lure the bugs. Device 10 may also use light sources to lure the bugs. Device 10 also uses heat to lure the bugs. When used inside to attract flies, device 10 relies on the scented bait, heat, and lights to attract the insects. Device 10 kills the bugs using at least one of an electrified grid and a sticky umbrella 22 that may be used alone or in combination.

Control box 12 generally includes a power supply 50, a power line 52, and a switch 54. Switch 54 allows the user to turn device 10 on and off to conserve power during daylight hours. Switch 54 may be a master switch that controls the power delivered to all other switches described in this application. Alternatively, switch 54 may only control power source 50 with a battery 56 being used to power device 10 when switch 54 is off. Power line 52 and power supply 50 are adapted to run on household current so that device 10 may be plugged into an outlet in a garage or house. Battery 56 may also be provided so that device 10 may run solely on battery power during the evening. Battery 56 may be recharged during the day or after a few evenings. A separate switch 57 may be used to conserve battery power.

An air pump 58 is also disposed in control box 12. A switch 60 is connected to air pump 58 to allow the user to selectively turn air pump 58 on and off. A first air outlet 62 extends from control box 12 into combustion chamber 14 to direct a flow of air from air pump 58 into combustion chamber 14 in the manner described below. A second air outlet 64 may also extend from air pump 58 to mixing chamber 18 as described below in more detail. Air pump 58 is adapted to direct a flow of air through outlets 62 and 64 when air pump 58 is turned on. The inventor has found that a pump for a fish tank is useful for directing these air flows. Control box 12 includes an inlet to allow air to enter control box 12 and access air pump 58. In alternative embodiments, air pump 58 is not used and the flow of air through device 10 is induced by heat.

Control box 12 may also include a switch 66 for the grid assembly 20 if grid assembly 20 is not controlled by switch 54.

Control box 12 is generally adapted to provide a stable stand for device 10 and may include a diameter that is broader than the remaining elements (other than umbrella 22) so that the user may place device 10 on a support surface while it is being used. Control box 12 may thus include a weight (the weight may be the battery 56) to stabilize device 10 when it is standing on a support surface. In other embodiments of the invention, device 10 may be hung from a tree or a stand.

Combustion chamber 14 includes a source of carbon dioxide 100 that may be any of a variety of carbon dioxide sources known in the art. Source 100 may thus be a typical wax candle, an oil lamp, a variety of other candle-like devices, a carbon dioxide cartridge, or a combustion device that burns a substance such as natural gas. These devices may be used alone or in combination. In the preferred embodiment of the invention, a simple wax candle 100 may be used to produce carbon dioxide in combustion chamber 14. Combustion chamber 14 includes a mount 102 that includes a magnet that securely holds candle 100 to mount 102. The magnetic mount is designed to work with a candle 100 having a metal sleeve. Magnetic mount 102 thus helps prevent candle 100 from tipping over when device 10 is being transported and when device 10 is hung from a support and swings in the wind.

Combustion chamber 14 further includes a door 104 that allows candle 100 to be placed into combustion chamber 14 and removed from combustion chamber 14. Door 104 may include a plurality of vents 106 to allow air to enter combustion chamber 14. Door 104 may be held to combustion chamber 14 with magnets. In other embodiments, door 104 is connected to combustion chamber 14 with a hinge.

The outlet end 110 of first air outlet 62 is positioned in combustion chamber 14 above carbon dioxide source 100. Outlet 110 is directed upwardly towards the outlet 112 of combustion chamber 14. A damper 114 may be used to control the airflow out of chamber 14. Outlet 112 is positioned at the top of chamber 14 and leads into catalyst chamber 16. The flow of air coming out of outlet 110 is thus directed immediately into catalyst chamber 16 and induces a flow of air from vents 106 through combustion chamber 14 leading out of outlet 112. The position of outlet 110 and vents 106 prevent candle 100 from blowing out in a strong breeze.

Catalyst chamber 16 includes a catalyst support structure 150 that includes a matrix that holds a catalyst useful for converting carbon monoxide to carbon dioxide. Structure 150 and the matrix allow gas to pass from chamber 14 to chamber 16. In one embodiment, the matrix that holds the catalyst is honeycomb-shaped in cross section and defining a plurality of passageways that pass through the matrix. Structure 150 may include a plurality of small tubes lined with the catalyst. The tubes may be arranged in a honeycomb pattern. The catalyst thus converts a portion of any carbon monoxide created by candle 100 into carbon dioxide. Support structure 150 allows air flow in at least a direction from chamber 14 toward chamber 18. Any catalyst known in the art may be used in this position. For example, the inventor contemplates that a catalyst having silica, platinum, and palladium beads may be used. In one embodiment, an automobile catalytic converter element may be used. These may be obtained from a junk yard and may be cleaned.

Catalyst support structure 150 is surrounded by a heater 152 that is controlled by a thermostat 154 positioned above heater 152 and catalyst support structure 150 at the upper end of catalyst chamber 16 or at the lower end of mixing chamber 18. Thermostat 154 and heater 152 are connected to power source 50. Thermostat 154 is set to control the temperature of catalyst support structure 150 so that the gas passing through structure 150 is heated. This temperature allows the temperature of the carbon dioxide exiting device 10 to match the temperature of carbon dioxide that exits a human being (or a higher temperature) so that mosquitos and other biting insects are drawn to the warm gas. Thermostat 154 thus turns the heater 152 off when the temperature is too high and turns heater 152 on when the temperature is too low. A switch 156 may be provided for thermostat 154 and heater 152.

The catalyst performs best at a high temperature. When the catalyst reaches a temperature of 127–128° F., carbon monoxide is effectively converted to carbon dioxide. The heat is generated from heater 152 and the heat from candle 100. The insulating properties of tube 158 and holding device 162 help warm the catalyst in catalyst support structure 150. The inventor has found that the following temperatures result in the following outputs of carbon monoxide when burning a lamp-oil-fueled candle 100. 127.6° F. results in 0.023 ppm carbon monoxide (measured on a Bacarach monoxide tester), 134.8° F. equals 0.022 ppm carbon monoxide; 141.3° F. results in 0.021 ppm carbon monoxide; 148.1° F. results in 0.020 ppm carbon monoxide; 151.9° F. results in 0.019 ppm carbon monoxide; 155.3° F. results in 0.018 ppm carbon monoxide; 170.2° F. results in 0.009 ppm carbon monoxide; 181.3° F. results in 0.008 ppm carbon monoxide; 190.1° F. results in 0.007 ppm carbon monoxide; 198.7° F. results in 0.006 ppm carbon monoxide; 206.4° F. results in 0.005 ppm carbon monoxide; 211° F. results in 0.004 ppm carbon monoxide; 216° F. results in 0.003 ppm carbon monoxide; 223.0° F. results in 0.002 ppm carbon monoxide; and 234.7° F. results in 0.001 ppm carbon monoxide. The inventor thus believes that a preferred embodiment of the invention should keep the temperature of catalyst chamber 16 at 206° F. This temperature also keeps the gas hot enough to exit device 10 at around 100° F.

Heater 152 may be disposed immediately adjacent catalyst support structure 150 or on the outside of an isolation tube 158. Isolation tube 158 surrounds catalyst support structure 150 and isolates it from a bait chamber 160. Isolation tube 158 may be fabricated from any of a variety of materials. When heater 152 is positioned inside isolation tube 158, isolation tube 158 may be fabricated from an insulating material such as glass. When heater 152 is disposed on the outside of isolation tube 158, isolation tube 158 may be fabricated from a material that transmits heat such as metal. In another embodiment, heater 152 is a coil heater with coils on the inside and outside of isolation tube 158.

A holding device 162 is disposed in bait storage chamber 160. Holding device 162 may be a porous material that holds a liquid bait designed to attract biting insects. The liquid bait is evaporated with the heat from heater 152 and rises upwardly into the air stream exiting catalyst chamber 16. A variety of baits may be used in bait chamber 160. One embodiment of a bait that has been found to be useful is a combination of water, gelatin, sugar, and flavoring. Oil may be added to reduce spoilage. Beef drippings may be used with water or oil to attract flies. Citric acid may be added to improve the smell. This bait may be disposed in bait chamber 160 in liquid form with or without holding device 162. One holding device 162 that is useful with this bait is a porous silica material. The silica material will not burn when exposed to the heat from heater 152. An alternative embodiment uses an additional bait cup to hold liquid bait.

Figure 2:
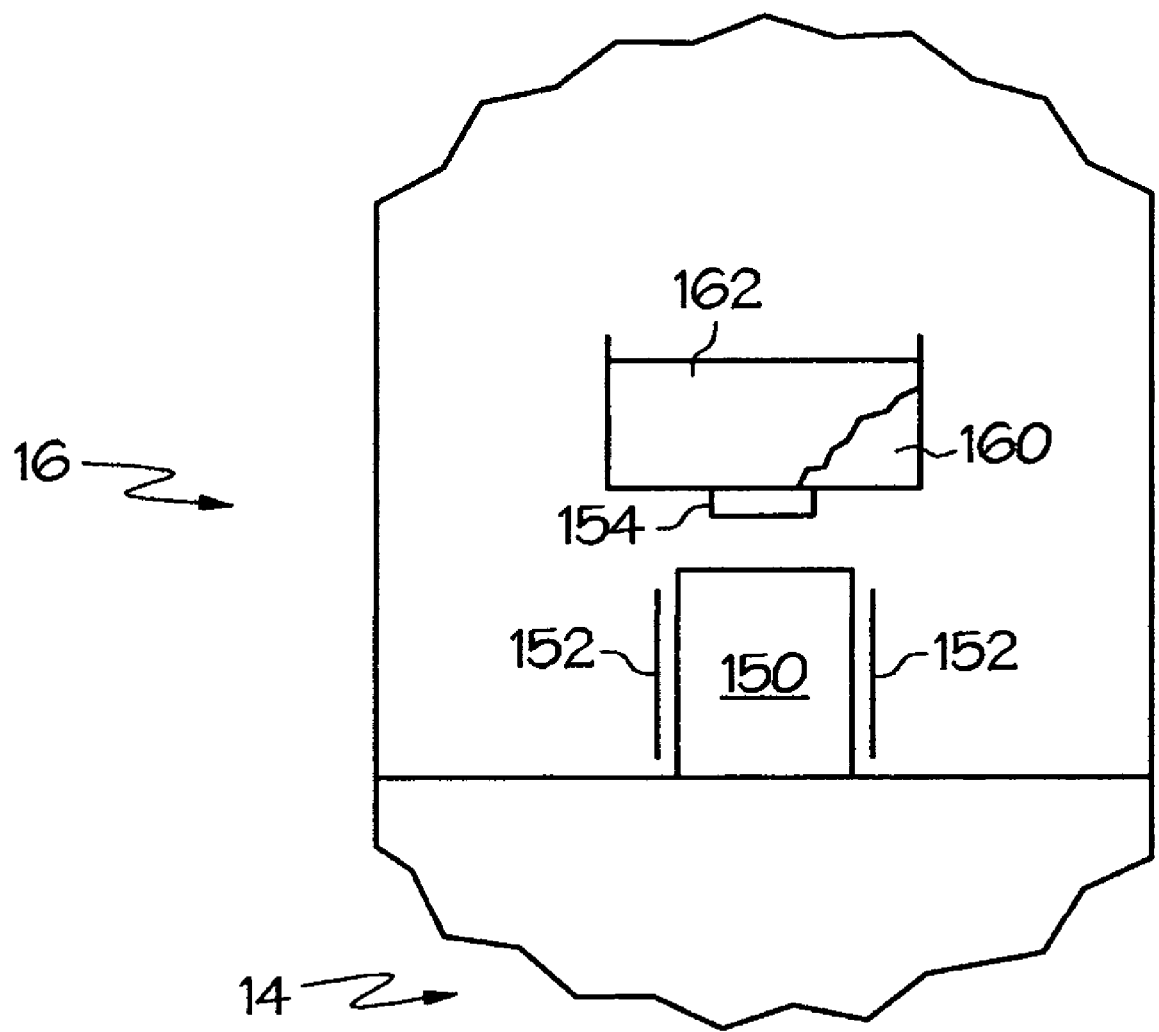
FIG. 2 is a schematic view of an alternative catalyst chamber.
Figure 3:
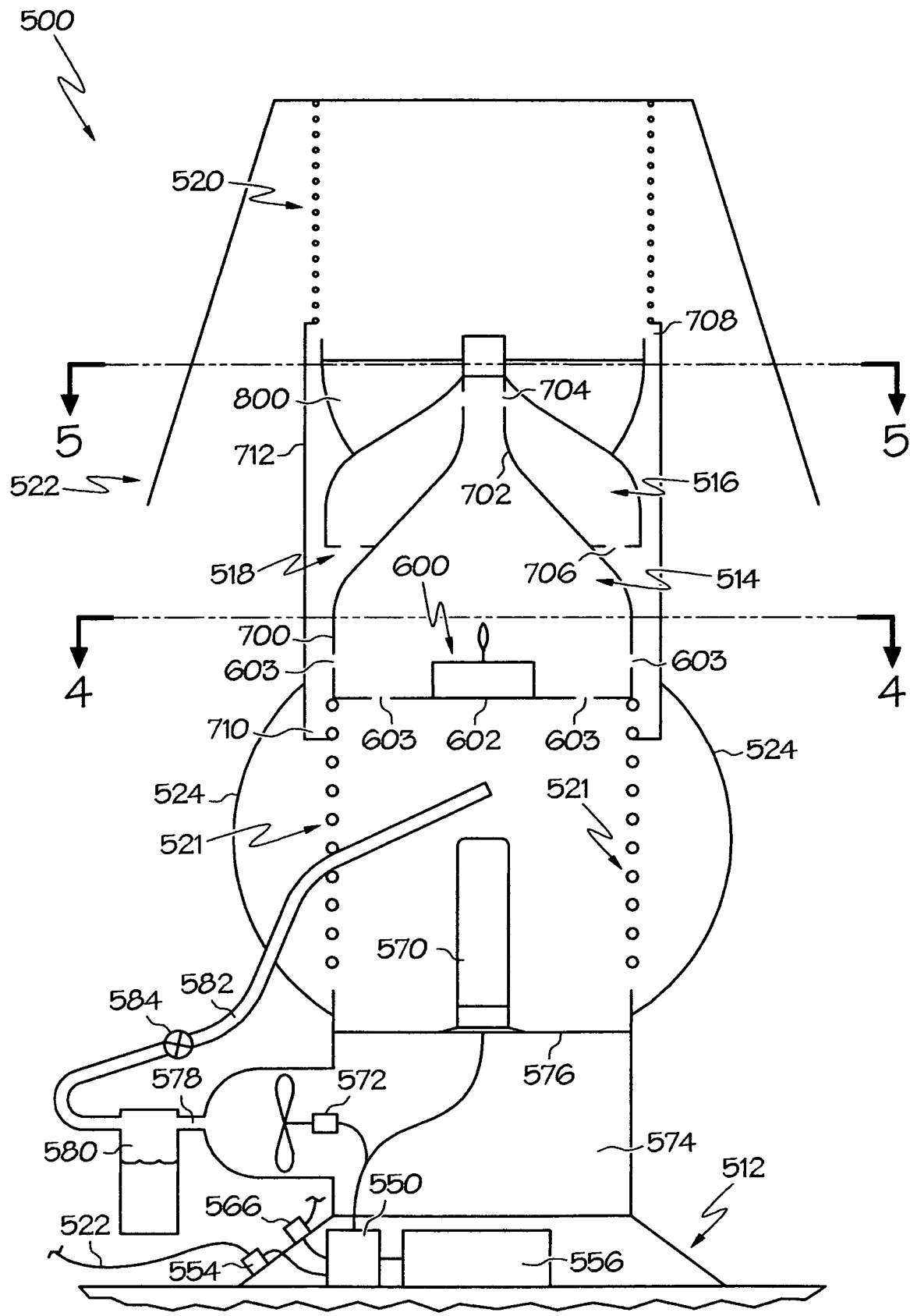
FIG. 3 is a longitudinal section view of another embodiment of the device with the components of the device shown schematically.
Figure 4:
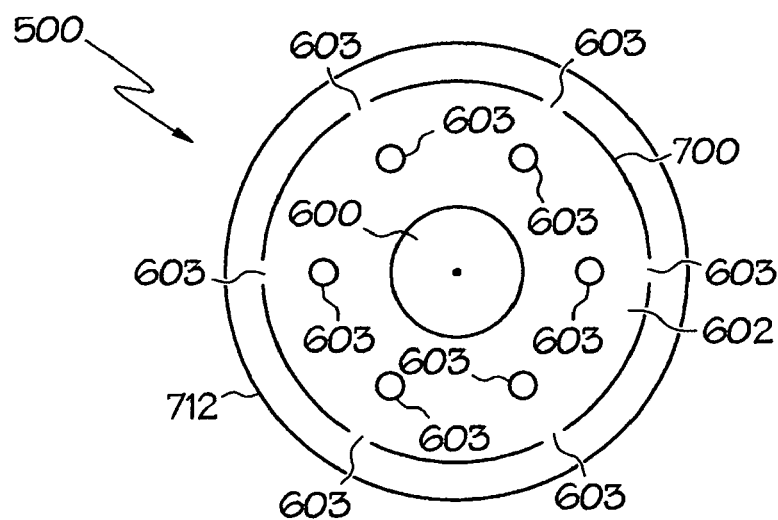
FIG. 4 is a section view taken along line 4—4 of FIG. 3.
Figure 5:
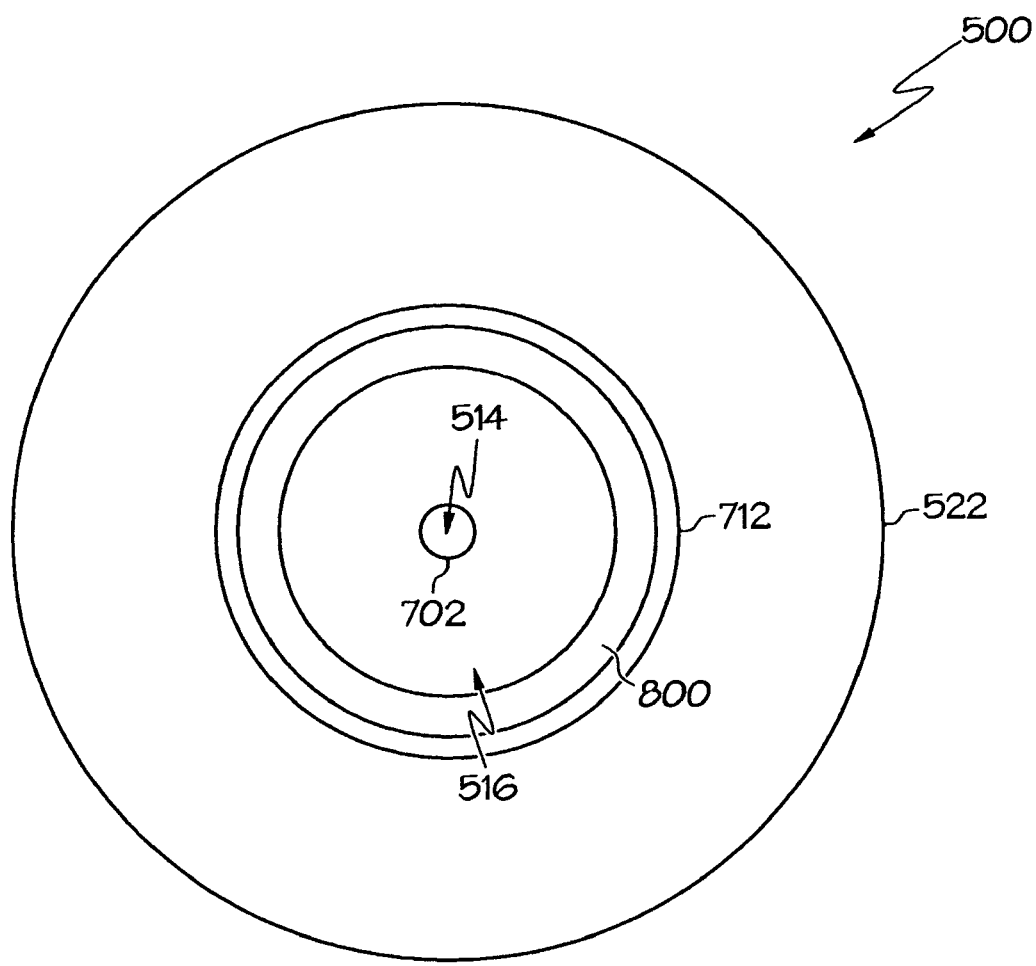
FIG. 5 is a section view taken along line 5—5 of FIG. 3.

An alternative location for the bait is depicted in FIG. 2 wherein a bait holding chamber 160 is disposed immediately above catalyst support structure 150. This location has the benefit of being directly above the heated air flow. This location may thus increase the evaporation of the bait in chamber 160. In an alternative embodiment, an insecticide may be placed in the bait locations with device 10 being used to distribute the insecticide.

Mixing chamber 18 is disposed above catalyst chamber 16. Mixing chamber 18 allows the carbon dioxide to mix with the evaporated bait. Mixing chamber 18 also distributes the baited air flow to the traps where the bugs are killed. Mixing chamber 18 may include a vertical release 200 and a horizontal release 202 that are each controlled by dampers 204 and 206. Dampers 204 and 206 allow the user to control the release of the baited air flow to the different traps depending on the location of device 10. A fan 208 may be used to induce the flow of bait through device 10 and to distribute the flow through releases 200 and 202. As depicted in FIG. 1, fan 208 is disposed radially inwardly of grid 250. Second air outlet 64 has an outlet 209 disposed in mixing chamber 18. If desired, a second bait chamber 210 may be used with device 10. A secondary bait 212 such as octenol may be positioned in second bait chamber 210. Second bait chamber 210 may be selectively opened and closed with valves 214. Valves 214 thus allow the user of device 10 to conserve second bait 212 that may be expensive to replace. Valves 214 may be closed during the day to prevent release of second bait 212.

Fan 208 may be configured to draw air (and thus any live insects) from inside grid assembly 20 as well as chamber 18. The air is then pushed out release 202 while killing any insects drawn from assembly 20.

Grid assembly 20 is positioned above vertical release 200 and includes an electrified grid 250 and a light 252 that are each controlled by power source 50 and a switch. Light 252 may be a blue light that is useful for attracting biting insects. Grid 250 carries an electric charge that is suitable to kill insects that come in contact with grid 250 or pass through the openings of grid 250. Device 10 introduces the baited air flow through release 200 into the center of grid 250 and thus attracts biting insects with light 252 and the baited air flow.

Device 10 also includes umbrella 22 that extends circumferentially around mixing chamber 18 and downwardly in the shape of a cone or an umbrella. Umbrella 22 is coated with a sticky substance that traps insects against umbrella 22 when an insect comes into contact with the sticky substance. The substance may be disposed only on the underside of umbrella 22 to reduce other objects from sticking to umbrella 22. In other embodiments, both the upper and lower surfaces of umbrella 22 may be coated. Umbrella 22 has been found to be particularly useful when device 10 is positioned a few feet above the ground because many mosquitos hover near the ground. When the mosquitos are drawn upwardly towards grid assembly 20, they come into contact with umbrella 22 and become stuck in the sticky substance. To further lure mosquitos and biting insects in this direction, release 202 directs the baited air flow outwardly under umbrella 22 where it falls downwardly towards the ground. Umbrella 22 may be solid or a mesh and may be readily disposable and replaceable once laden with dead insects. Dried gelatin or other bait may be disposed on umbrella 22.

In addition to light 252, device 10 may use a transparent body around combustion chamber 14 to allow the light of candle 100 to be viewed from outside device 10. The light from candle 100 is also useful for luring biting insects towards device 10. The transparent body may be combined with light reflecting and distributing devices (such as glass beads) that distribute the light and change its color. In addition, a "power on" light 260 may be disposed on the outside of control box 12 to inform the user of device 10 that device 10 is properly powered. Light 260 may be designed to lure biting insects towards device 10. In the preferred embodiment, lights 252, 260, and a light from candle 100 are different types of lights in order to lure different types of biting insects towards device 10.

A second embodiment of the insect killing device of the present invention is indicated generally by the numeral 500 in the accompanying drawings. In one embodiment, device 500 generally includes a control box 512, a combustion chamber 514, a cooling chamber 516, a mixing chamber 518, first and second grid assemblies 520,521 and an umbrella 522. Umbrella 522 protects first grid 520 while a cage 524 protects second grid 521. Cage 524 may also be sticky to catch bugs. Umbrella 522 may also protect device 500 from rain. Device 500 functions to lure bugs to device 500 and to kill bugs once they arrive. When used outside, device 500 uses carbon dioxide as the primary bait for the bugs. In addition, device 500 may use a scented bait to help lure the bugs. Device 500 may also use light sources to lure the bugs. Device 500 also uses heat to lure the bugs. When used inside to attract flies, device 500 relies on the scented bait, heat, and lights to attract the insects. Device 500 kills the bugs using at least one of an electrified grid and a sticky umbrella 522 that may be used alone or in combination.

Control box 512 generally includes a power supply 550, a power line 552, and a switch 554. Switch 554 allows the user to turn device 500 on and off to conserve power during daylight hours. Switch 554 may be a master switch that controls the power delivered to all other switches described in this application. Alternatively, switch 554 may only control power source 550 with a battery 556 being used to power device 500 when switch 554 is off. Power line 552 and power supply 550 are adapted to run on household current so that device 500 may be plugged into an outlet in a garage or house. Battery 556 may also be provided so that device 500 may run solely on battery power during the evening. Battery 556 may be recharged during the day or after a few evenings. Control box 512 may also include a switch 566 for the grid assemblies 520, 521 if grid assemblies 520, 521 are not controlled by switch 554. Control box 512 is generally adapted to provide a stable stand for device 500 and may include a diameter that is broader than the remaining elements (other than umbrella 522) so that the user may place device 500 on a support surface while it is being used. Control box 512 may thus include a weight (the weight may be the battery 556) to stabilize device 500 when it is standing on a support surface. In other embodiments of the invention, device 500 may be hung from a tree or a stand.

Power source 550 supplies power to a light 570 disposed inwardly of grid 521. Light 570 is a type designed to attract insects to grid 521. Power source 550 also supplies power to a mechanism 572 that moves air through a lower chamber 574. Mechanism 572 may be a fan, an air pump, or another device that moves air and carbon dioxide from an inlet 576 to an outlet 578 of chamber 574. Mechanism 572 vibrates while in use to attract insects to device 500. A bait container 580 is in fluid communication with outlet 578. Any of a variety of baits may be used in container 580. A delivery tube 582 provides fluid communication between container 580 and a delivery location disposed adjacent to or inwardly of one of or both grids 520, 521. A valve 584 may be used to seal container 580 to preserve the bait in container 580.

Combustion chamber 514 includes a source of heated carbon dioxide 600 that may be any of a variety of carbon dioxide sources known in the art. Source 600 may thus be a typical wax candle, an oil lamp, a variety of other candle-like devices, a carbon dioxide cartridge, or a combustion device that burns a substance such as natural gas. These devices may be used alone or in combination. When sources of carbon dioxide are used that do not involve combustion to produce heat, a heater (such as an electric heater) is used to heat the carbon dioxide in chamber 514. In the preferred embodiment of the invention, a simple wax candle 600 may be used to produce carbon dioxide in combustion chamber 514. Combustion chamber 514 includes a mount 602 that includes a magnet that securely holds candle 600 to mount 602. The magnetic mount is designed to work with a candle 600 having a metal sleeve. Magnetic mount 602 thus helps prevent candle 600 from tipping over when device 500 is being transported and when device 500 is hung from a support and swings in the wind. Candle 600 is protected from the wind by the walls of combustion chamber 514. Candle 600 also produces light that attracts insects.

Candle 600 may be placed into and removed from combustion chamber 514 by lifting the body that defines chambers 514 and 516 from mount 602. The body defines openings 603 that allow air to flow into chamber 514 and, in some situations, carbon dioxide to fall out of chamber 514 into grid 521. Openings 603 are small in diameter to prevent wind from blowing out candle 600. A plurality of pinhole openings may be used to protect candle 500.

The body that defines combustion chamber 514 defines a broad base 700 and a narrow neck 702. The body tapers smoothly from base 700 toward neck 702. Neck 702 defines at least one outlet 704 that allows the heated gasses to escape chamber 514 into chamber 516.

Cooling chamber 516 is disposed around at least the upper portion of combustion chamber 514. The body that defines cooling chamber 516 defines at least one outlet 706 that allows gas to exit chamber 516 into chamber 518. Outlet 706 is disposed lower than outlet 704 so that the cooling gases will readily exit chamber 516. The gas cools and drops through chamber 518 creating a flow that draws more flow into chamber 518. Mixing chamber 518 has an upper outlet 708 and a lower outlet 710 so that gas may be directed adjacent both grids 520, 521. An outerwall 712 defines chamber 518. Wall 712 may be supported by grid 521 and/or cage 524. Wall 712 also protects candle 600 from wind.

A bait receptacle 800 sits directly on top of cooling chamber 516 so that the heated gas entering cooling chamber 516 will heat the lower wall of receptacle 800 to warm the bait disposed in receptacle 800. The warmed bait will evaporate into grid 520. Again, any of a variety of baits may be used such as those discussed above.

In an alternative embodiment, a substance to extinguish candle 600 (such as water or a powder) may be disposed between portions of combustion chamber 514 ad cooling chamber 516 or between cooling chamber 516 and bait receptacle 800. This substance would be released to extinguish candle 600 if device 500 were subjected to sufficient force to break part of the body that defines chambers 514 and 516. This substance thus acts as a safety device for device 500.

Figure 6:
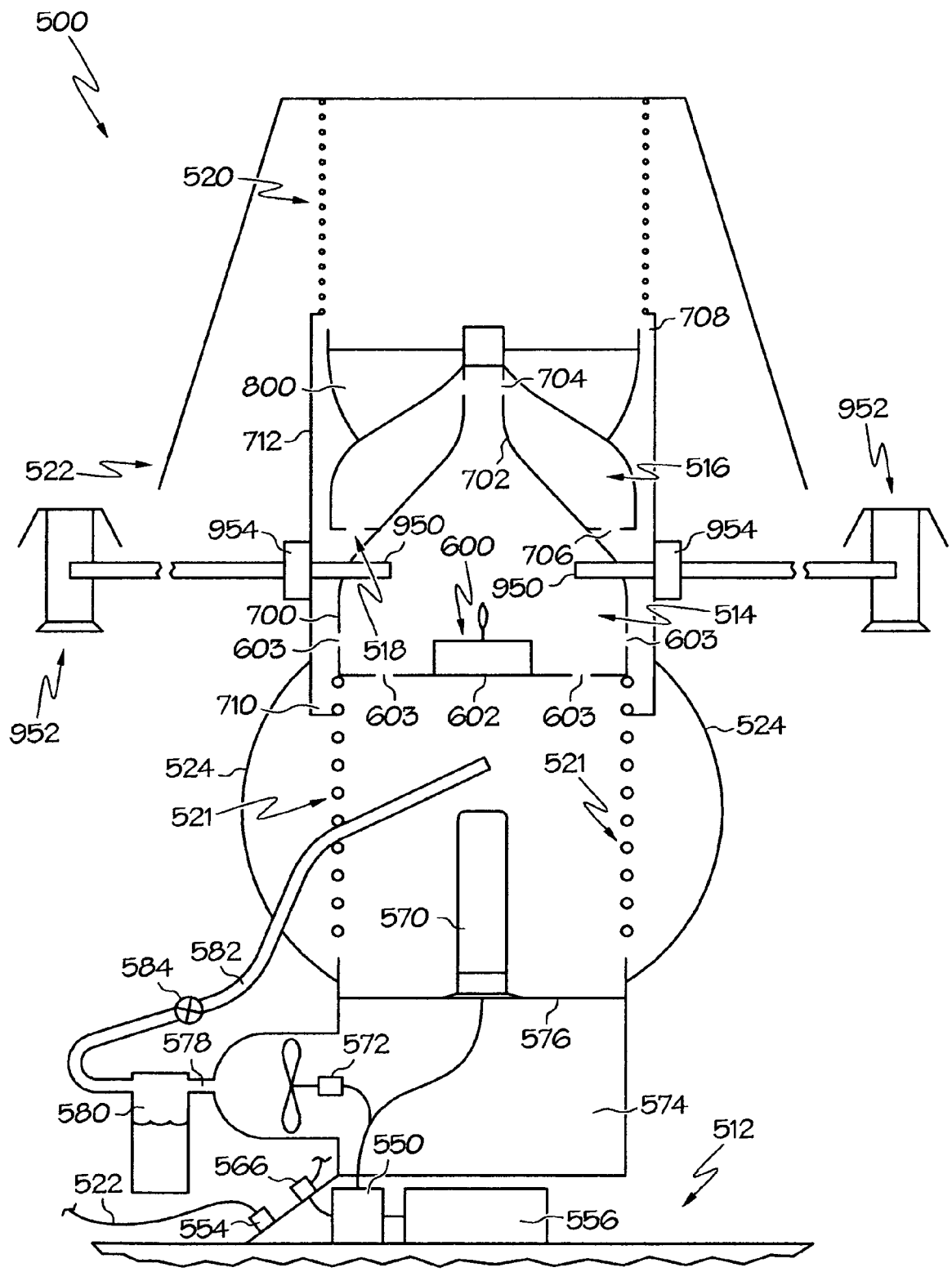
FIG. 6 is a view similar to FIG. 3 showing an alternative embodiment of the invention.

An alternative embodiment of the invention is shown in FIG. 6 wherein take off pipes 950 are provided in combustion chamber 514. Take off pipes 950 may also be provided inside grid 521. Pipes 950 are used to supply secondary killing devices 952 disposed at remote locations. Fans or air pumps 954 are provided to move the gas from combustion chamber 514 to devices 952. Devices 952 may be powered or unpowered. In one example, device 951 may use a small electric heater under its bait receptacle.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. In addition, the elements described for one embodiment may be interchanged with the elements for the other embodiments without departing from the concepts of the invention.

The invention claimed is:

1. A bug killing device comprising:
   a body; the body defining a combustion chamber; the combustion chamber having an outlet;
   a source of heated carbon dioxide gas; the source being disposed within the combustion chamber;
   a first bait receptacle disposed above the combustion chamber; a bait being disposed in the first bait receptacle; the first bait receptacle being configured to allow the bait disposed in the first bait receptacle to be warmed by the heated carbon dioxide;
   a first electrified grid disposed above the bait receptacle;
   the body further defining a cooling chamber; at least a portion of the cooling chamber being disposed between the combustion chamber and the first bait receptacle; the outlet to the combustion chamber also defining an inlet to the cooling chamber; and
   the cooling chamber having an outlet disposed lower than the inlet to the cooling chamber.

2. The device of claim 1, further comprising an umbrella disposed around a portion of the first electrified grid assembly such that a portion of the first electrified grid assembly is disposed within the umbrella; the umbrella having an inner surface and an outer surface; at least one of the inner and outer surfaces of the umbrella being sticky.

3. The device of claim 1, further comprising a second electrified grid disposed below the combustion chamber; the body defining at least one opening providing fluid communication between the combustion chamber and the second electrified grid.

4. The device of claim 3, further comprising a light disposed inside the second electrified grid.

5. The device of claim 3, wherein the body further defines a lower chamber;
the lower chamber disposed below the second electrified grid; the lower chamber defining an inlet and an outlet; and
delivery means for moving air from the inlet of the lower chamber towards the outlet of the lower chamber; the outlet of the lower chamber being disposed within the second electrified grid.

6. The device of claim 5, further comprising a second bait receptacle; the second bait receptacle being in fluid communication with the delivery means and the second electrified grid such that bait from the second bait receptacle is delivered to the second electrified grid.

7. The device of claim 6, further comprising at least a first valve having an open condition and a sealed condition; the sealed condition of the valve preserving the bait in the second bait receptacle.

8. The device of claim 3, further comprising a protective cage disposed around the second electrified grid.

9. The device of claim 1, wherein
the portion of the body defining the combustion chamber has a tapered upper neck disposed inwardly of the cooling chamber; the upper neck defining the inlet to the cooling chamber that provides fluid communication between the combustion chamber and the cooling chamber.

10. The device of claim 9, wherein the first bait receptacle sits directly on the cooling chamber.

11. The device of claim 1, further comprising a light disposed inwardly of the electrified grid.

12. A bug killing device comprising:
a body; the body defining a combustion chamber; the combustion chamber having an upper outlet and a lower outlet;
a candle in the combustion chamber; the candle producing heated gases when burned; the heated gases including carbon dioxide;
a first bait receptacle disposed above the combustion chamber; a bait being disposed in the first bait receptacle; the first bait receptacle being adapted to allow the heated gasses from the candle to warm the bait disposed in the first bait receptacle;
a first electrified grid disposed above the bait receptacle;
a second electrified grid disposed below the combustion chamber;
the second electrified grid defining a space having an upper end and a lower end; the lower outlet of the combustion chamber disposed at the upper end of the space;
a light disposed inside the space defined by the second electrified grid;
the body further defining a lower chamber;
the lower chamber disposed below the space defined by the second electrified grid; the lower chamber defining an inlet and an outlet; the inlet to the lower chamber being disposed at the lower end of the space defined by the second electrified grid;
a delivery tube having an inlet in fluid communication with the outlet of the lower chamber; the delivery tube having an outlet; and
a mechanism that moves air from the inlet of the lower chamber to the outlet of the delivery tube; the outlet of the delivery tube being disposed within the space defined by the second electrified grid.

13. The device of claim 12, further comprising an umbrella disposed around a portion of the first electrified grid assembly such that a portion of the first electrified grid assembly is disposed within the umbrella; the umbrella having an inner surface and an outer surface; at least one of the inner and outer surfaces of the umbrella being sticky.

14. The device of claim 12, wherein the body further defines a cooling chamber disposed between the combustion chamber and the first bait receptacle; and the portion of the body defining the combustion chamber having an upper neck and a lower base; the upper neck defining at least one inlet to the cooling chamber that provides fluid communication between the combustion chamber and the cooling chamber.

15. A bug killing device comprising:
a body; the body defining a combustion chamber;
a source of heated carbon dioxide; the source of heated carbon dioxide being located in the combustion chamber;
a first bait receptacle disposed above the combustion chamber; a bait being disposed in the first bait receptacle; the first bait receptacle being configured to allow the bait disposed in the first bait receptacle to be warmed by the heated carbon dioxide;
a first electrified grid disposed above the first bait receptacle;
a second electrified grid disposed below the combustion chamber;
the body further defining a cooling chamber disposed between the combustion chamber and the first bait receptacle;
the portion of the body defining the combustion chamber having an upper neck and a lower base; the upper neck defining at least one inlet to the cooling chamber that provides fluid communication between the combustion chamber and the cooling chamber; and
the portion of the body defining the cooling chamber defining an outlet to the cooling chamber that is disposed below the inlet to the cooling chamber and above the second electrified grid.

16. The device of claim 15, wherein the neck is tapered with respect to the lower base.

17. The device of claim 16, wherein the body further defines a lower chamber;
the lower chamber disposed below the second electrified grid; the lower chamber defining an inlet and an outlet; and
delivery means for moving air from the inlet of the lower chamber towards the outlet of the lower chamber; the outlet of the lower chamber being disposed within the second electrified grid.

18. The device of claim 17, further comprising a second bait receptacle; the second bait receptacle being in fluid communication with the delivery means and the second electrified grid such that bait from the second bait receptacle is delivered to the second electrified grid.

19. The device of claim 18, further comprising at least a first valve having an open condition and a sealed condition; the sealed condition of the valve preserving the bait in the second bait receptacle.

* * * * *